United States Patent [19]
Yoshida et al.

[11] Patent Number: 6,023,560
[45] Date of Patent: Feb. 8, 2000

[54] IMAGE FORMING APPARATUS ACCEPTING IMAGE DATA TRANSMITTED FROM A PLURALITY OF TRANSMITTERS

[75] Inventors: Eiichi Yoshida; Toshiyuki Yamashita, both of Toyokawa, Japan

[73] Assignee: Minolta Co., Ltd., Osaka, Japan

[21] Appl. No.: 08/947,334

[22] Filed: Oct. 8, 1997

[30] Foreign Application Priority Data

Mar. 12, 1997 [JP] Japan ..................... 9-057881

[51] Int. Cl.$^7$ ..................... G06F 15/00
[52] U.S. Cl. ................ 395/115; 395/116; 358/404; 358/444; 358/468
[58] Field of Search .................. 395/112, 113, 395/114–116; 358/468, 448, 404, 444

[56] References Cited

U.S. PATENT DOCUMENTS

| | | | |
|---|---|---|---|
| 5,047,957 | 9/1991 | Ikenoue | 364/519 |
| 5,210,872 | 5/1993 | Ferguson et al. | 395/650 |
| 5,535,312 | 7/1996 | Hammer et al. | 395/115 |
| 5,659,670 | 8/1997 | AuClair | 395/115 |

FOREIGN PATENT DOCUMENTS 4-32857  4/1992  Japan .

*Primary Examiner*—Edward L. Coles
*Assistant Examiner*—Derrick Fields
*Attorney, Agent, or Firm*—McDermott, Will & Emery

[57] ABSTRACT

A maximum acceptable number (max_req_num(i)) is set for each transmission device (source of request) (i) which transmits image data. If it is determined that the maximum acceptable number is set for a source of request of a job, determination is made as to whether or not the number of currently accepted jobs from the source of request (current_req_num(i)) is less than the maximum acceptable number. If so, determination is made as to whether or not the number of jobs exceeds the maximum acceptable number which is the limit of acceptance of a memory in an image forming apparatus, if a currently requested job is accepted. If not exceeds, "acceptable" is given to the source of request. If exceeds, or if the number of currently accepted jobs from the source of request reaches the maximum acceptable number, "not acceptable" is transmitted to the source of request. Accordingly, an image forming apparatus is provided in which image data from a specific transmission device is accepted in preference to data from other transmission device when an image according to image data from a plurality of transmission devices is formed.

18 Claims, 15 Drawing Sheets

1 COPYING MACHINE

FIG.9

JOB REQUEST NUMBER MANAGEMENT TABLE T3

| | SOURCE OF REQUEST 0 (COPY) | SOURCE OF REQUEST 1 (EXTERNAL 1) | SOURCE OF REQUEST 2 (EXTERNAL 2) | SOURCE OF REQUEST 3 (EXTERNAL 3) | ... |
|---|---|---|---|---|---|
| MAXIMUM NUMBER max_req_num(i) | 5 | 3 | — | 3 | ... |
| CURRENTLY ACCEPTED NUMBER current_req_num(i) | 2 | 1 | 0 | 2 | ... |

FIG.13

JOB REQUEST NUMBER MANAGEMENT TABLE T4

| | SOURCE OF REQUEST 0 (COPY) | SOURCE OF REQUEST 1 (EXTERNAL 1) | SOURCE OF REQUEST 2 (EXTERNAL 2) | SOURCE OF REQUEST 3 (EXTERNAL 3) | ... | SUM OF ACCEPTED NUMBER OF APPARATUS |
|---|---|---|---|---|---|---|
| CURRENTLY ACCEPTED NUMBER current_req_num(i) | 2 | 1 | 2 | 5 | ... | 10 (current_req_sum) |
| MINIMUM GUARANTEED NUMBER min_req_num(i) | 3 | — | — | — | ... | — |

IMAGE FORMING APPARATUS ACCEPTING IMAGE DATA TRANSMITTED FROM A PLURALITY OF TRANSMITTERS

BACKGROUND OF THE INVENTION

1. Field of the Invention

The present invention relates to an image forming apparatus, and more particularly relates to an image forming apparatus including a memory which stores image data supplied from a plurality of transmitters.

2. Description of the Related Art

Among image forming apparatuses of the above kind, an image forming apparatus has been known which enables a copy operation for copying an image read by an image reading unit constituted by a scanner or the like, and a print operation for printing image data supplied from an external unit such as a personal computer. Such an image forming apparatus includes a memory connected to transmitters of an image reading unit and an external unit for storing image data supplied from those transmitters, and an image forming unit which successively forms an image according to image data stored in the memory.

Particularly, in an image forming apparatus having a multi-job function, even if image formation is proceeding in the image forming unit according to image data for a group of original documents (job), registration of an image forming operation in which image data for another job is transmitted from an image reading unit or an external unit to be stored in a memory is possible.

However, there is a limitation in the number of jobs stored in the memory. Therefore, once image data for the limited number of jobs is stored in the memory, image data for a job transmitted from the image reading unit or the external unit is not accepted by the memory since the memory cannot store the data anymore, unless the number of jobs stored in the memory is reduced by forming an image in the image forming unit or the like.

In some cases, a user may desire to use the image forming apparatus for a job transmitted from a specific transmitter prior to using for any job transmitted from other transmitter.

When an image forming apparatus connected to a plurality of transmitters which transmit image data is integrally structured with an image reading unit, for example, a user often attends the image reading operation in the image reading unit. In this case, the user would desire to use the image forming apparatus for the image reading unit in preference to other units.

A problem occurring in such a case is that any job from an image reading unit which should be given a priority is not accepted in a conventional image forming apparatus if a transmitter other than that of the image reading unit transmits image data for a large amount of jobs even temporarily, since the large amount of jobs reach the limitation of storage of the memory.

SUMMARY OF THE INVENTION

One object of the present invention is to provide an image forming apparatus which can accept image data from a specific transmitting device in preference to data from other transmitting device.

Another object of the invention is to provide an image forming apparatus which can accept image data from a specific transmitting device in preference to data from other transmitting device in a manner desired by a user.

Still another object of the invention is to provide an image forming apparatus having a memory which accepts image data from a specific transmitting device in preference to data from other transmitting device.

Above objects of the present invention are achieved by providing following components for an image forming apparatus. Specifically, an image forming apparatus according to the present invention is connected to a plurality of transmitting devices. The transmitting device respectively transmit a plurality of jobs including image data. The image forming apparatus includes:

- a receiver which receives the transmitted plurality of jobs;
- a memory which stores a plurality of image data included in the plurality of jobs;
- an image forming unit which forms an image according to image data stored in the memory;
- a maximum value memory which stores a maximum value of the number of jobs which can be stored in the memory for respective transmitting devices; and
- a controller which controls such that the image forming apparatus does not accept transmission of a job from a transmitting device when the number of jobs supplied from the transmitting device that are currently accepted reaches the maximum value.

When an amount of image data defined in the maximum value memory for each transmitting device is exceeded, the memory cannot accept transmission of data from the transmitting device. Accordingly, the amount of image data accepted for each transmitting device can be limited.

As a result, the amount of image data for each transmitting device accepted and stored in the memory can be limited, so that image data from a specific transmitting device can be accepted in preference to data from other transmitting device.

Preferably, the maximum value can be set.

The maximum value defined in the maximum value memory can be conveniently set.

Accordingly, image data from a specific transmitting device can be accepted conveniently in preference to data from other transmitting device in a manner desired by a user.

According to an aspect of the invention, an image forming apparatus includes a memory which stores image data transmitted from a plurality of transmitting devices. In the memory, a storage area for a specific amount is ensured for a specific transmitting device. The image forming apparatus further includes a control unit which controls such that transmission of image data from the transmitting device to the memory is not accepted when a prescribed condition is satisfied. The control unit accepts transmission of image data from a transmitting device other than the specific transmitting device when the following expressions (1) and (2) or expressions (3) and (4) are satisfied.

$$n > m \quad (1)$$

$$(k - p) > (n - m) \quad (2)$$

$$n \leq m \quad (3)$$

$$(k - p) > 0 \quad (4)$$

In the expressions above k is a maximum amount of image data which can be stored in the memory, p is a total amount of image data stored in the memory, m is an amount of image data transmitted from the specific transmitting device and stored in the memory, and n is the specific amount.

It is ensured that a specific amount "n" of image data at a minimum is always stored in a memory for a specific transmitting device.

Accordingly, image from a specific transmitting device can be accepted by a memory in preference to data from other transmitting device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows a table for managing the number of acceptable jobs in order to determine as to acceptance of a job shown in FIGS. 4 and 5.

FIG. 13 shows a table for managing the number of acceptable jobs for determining as to acceptance of a job shown in FIGS. 4 and 5.

DESCRIPTION OF THE PREFERRED EMBODIMENTS (First Embodiment)

Referring to attached figures, one example of an embodiment of the present invention is described.

Figure 1:
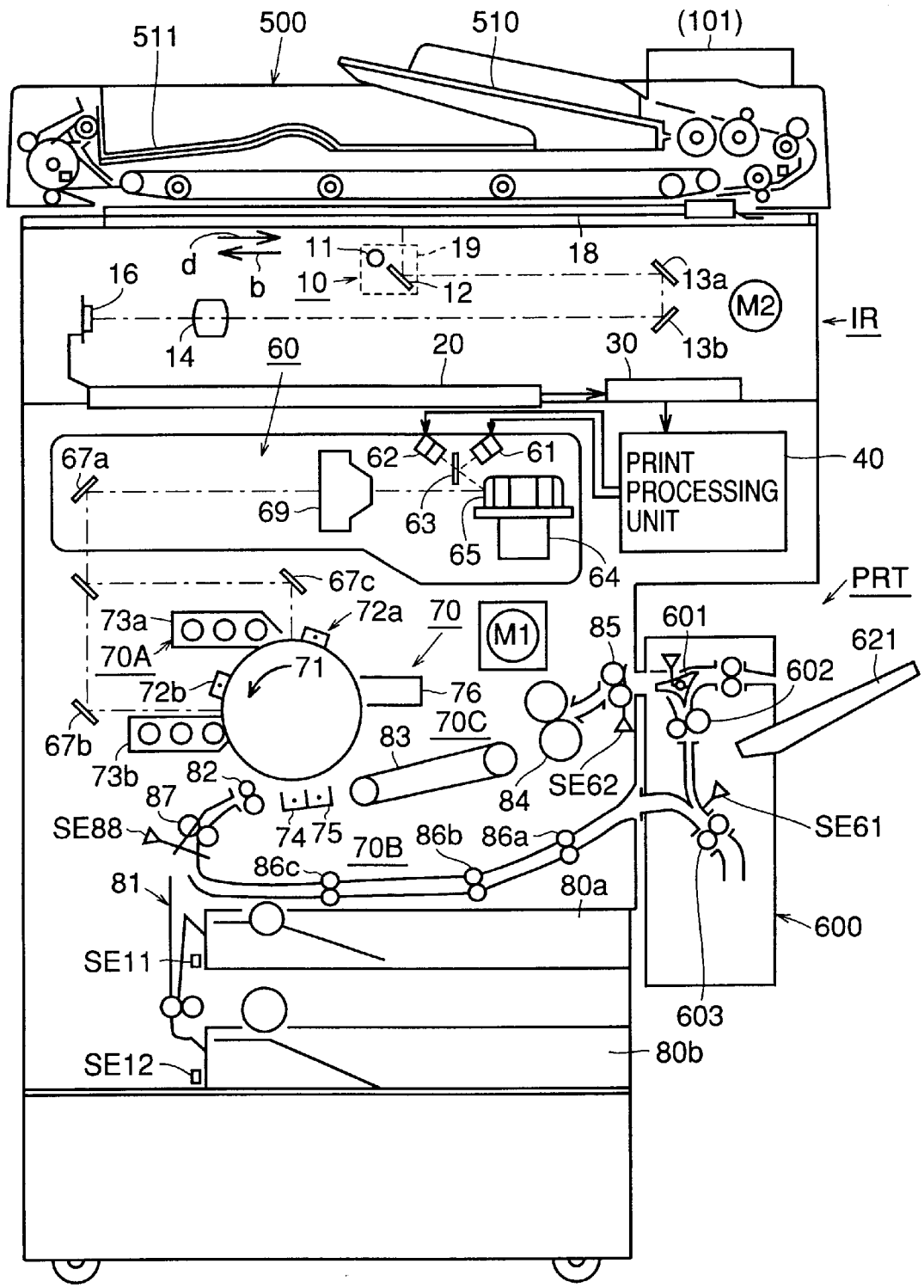
FIG. 1 is a cross sectional view illustrating an entire structure of a copying machine as one example of an image forming apparatus according to the present invention.

FIG. 1 is a cross sectional view showing an entire structure of a copying machine 1 as one example of an image forming apparatus according to the present invention.

Referring to FIG. 1, copying machine 1 includes: a scan system 10 which reads an original and converts it to an image signal; an image signal processing unit 20 which processes the image signal transmitted from scan system 10; an image memory unit 30 which stores image data supplied from image signal processing unit 20; a print processing unit 40 which drives semiconductor lasers 61 and 62 based on the image data supplied from the image memory unit 30; an optical system 60 which combines two laser beams from semiconductor lasers 61 and 62 and directs the resultant beam to a prescribed position of exposure on a photoreceptor drum 71; an image forming system 70 which develops a latent image formed through exposure and transfers it onto a sheet to be fixed and forms an image; an operation panel 101 placed at the upper surface of a body (located at the upper surface of copying machine 1 (in a vertical direction to the surface of this paper)); a document transport unit 500 which transports an original and reverses the original if necessary; and a re-feed unit 600 for feeding the sheet to a position of transfer again.

An image reader IR is constituted by scan system 10, image signal processing unit 20, and the like, and a printer PRT is constituted by print processing unit 40, optical system 60, image forming system 70, and the like.

Scan system 10 is constituted by an exposure lamp 11 and a first mirror 12 attached to a scanner 19 which moves below a platen glass 18, fixed mirrors 13a and 13b, a collective lens 14, a photoelectric conversion element 16 using a CCD array or the like, a scan motor M2, and the like.

Photoelectric conversion element 16 converts an image of non-specified color mainly of black and an image of a specified color (red) in an original respectively to electric signals.

Image signal processing unit 20 processes an image signal output from photoelectric conversion element 16 and outputs image data to image memory unit 30.

Print processing unit 40 receives the image data and supplies it to semiconductor lasers 61 and 62 depending on the image data transmitted. Optical system 60 is constituted by semiconductor lasers 61 and 62, a dichromic mirror 63 which combines two laser beams from semiconductor lasers 61 and 62, a polygon mirror 65 which polarizes the combined laser beam, a motor 64 which rotates polygon mirror 65, a main lens 69, reflection mirrors 67a, 67b, 67c, and the like.

Image forming system 70 is constituted by a development transfer system 70A, a transport system 70B, and a fixing system 70C.

Development transfer system 70A is constituted by a photoreceptor drum 71 which is driven to rotate in a counterclockwise direction in FIG. 1, a first corona charger 72a, a first developing unit 73a, a second corona charger 72b, a second developing unit 73b, a transfer charger 74, a separation charger 75, a cleaning unit 76 and the like. Components except for photoreceptor drum 71 are placed around photoreceptor drum 71 in order from the upstream side of the direction of rotation. The first developing unit 73a contains a two-component developer formed of a toner and a carrier.

Transport system 70B is constituted by cassettes 80a and 80b for holding sheets, size detection sensors SE11 and SE12 which detects the size of the sheet, a sheet guide 81, a timing roller 82, a transport belt 83, horizontal transport rollers 86a–86c which transport sheets supplied from re-feed unit 600, and the like.

Fixing system 70c is constituted by a fixing roller 84 which transports a toner image on a sheet while fixing it by heat and pressure, a discharge roller 85, a discharge sensor SE62 which detects discharging of sheets, and the like.

Re-feed unit 600 is of circulation type which temporarily holds a sheet discharged from discharge roller 85, and transports it to horizontal transport roller 86a in transport system 70B for forming an image (printing) again. The sheet is reversed in duplex mode, and not reversed in composite mode by re-feed unit 600. Re-feed unit 600 is constituted by a switching claw 601 for switching from discharging to a discharge tray 621, to re-feeding and vice versa, a transport roller 602, a reverse roller 603, a reverse sensor SE61 and the like.

In the duplex mode, the left edge portion of switching claw 601 is moved upward by a solenoid (not shown). Accordingly, a sheet discharged from discharge roller 85 is directed to transport roller 602 and to reverse roller 603.

When the trailing edge of a sheet reaches reverse sensor SE61, reverse roller 603 reverses to allow the sheet to be transported toward horizontal transport roller 86a. The sheet travels through horizontal transport rollers 86b and 86c and an intervening roller 87, arrives at timing roller 82 and waits there.

At this time, the next sheets follow successively with a prescribed interval. The number of sheets having a print on one side that can wait at a copy path including transport rollers 602 and 603 and horizontal transport rollers 86a–86c depends on the length of the sheet and the copy path if there is no delay of image data. In this embodiment, the maximum number of sheets that can wait there is three. In front of intervening roller 87, sensor SE88 which detects the leading edge of a transported sheet is provided.

Document transport unit 500 automatically transports an original placed on a document feed tray 510 onto platen glass 18 and discharges it to a document discharge unit 511 after the surface (lower surface) of the original is read by scanner 19.

The data read by image reader IR is input to image memory unit 30 and stored therein.

In copying machine 1, the speed of movement of scanner 19 in the direction of arrow b is higher than that in the direction of arrow d. Scanning of an image by photoelectric conversion element 16 when scanner 19 moves in the direction of b is referred to as a preliminary scanning. At this time, the size and position of an original on the platen glass are detected based on the image data output from photoelectric conversion element 16. Scanning of an image by photoelectric conversion element 16 when scanner moves in the direction of d is referred to as a main scanning, in which reading of image data of an original is carried out based on image data output from photoelectric conversion element 16.

Figure 2:
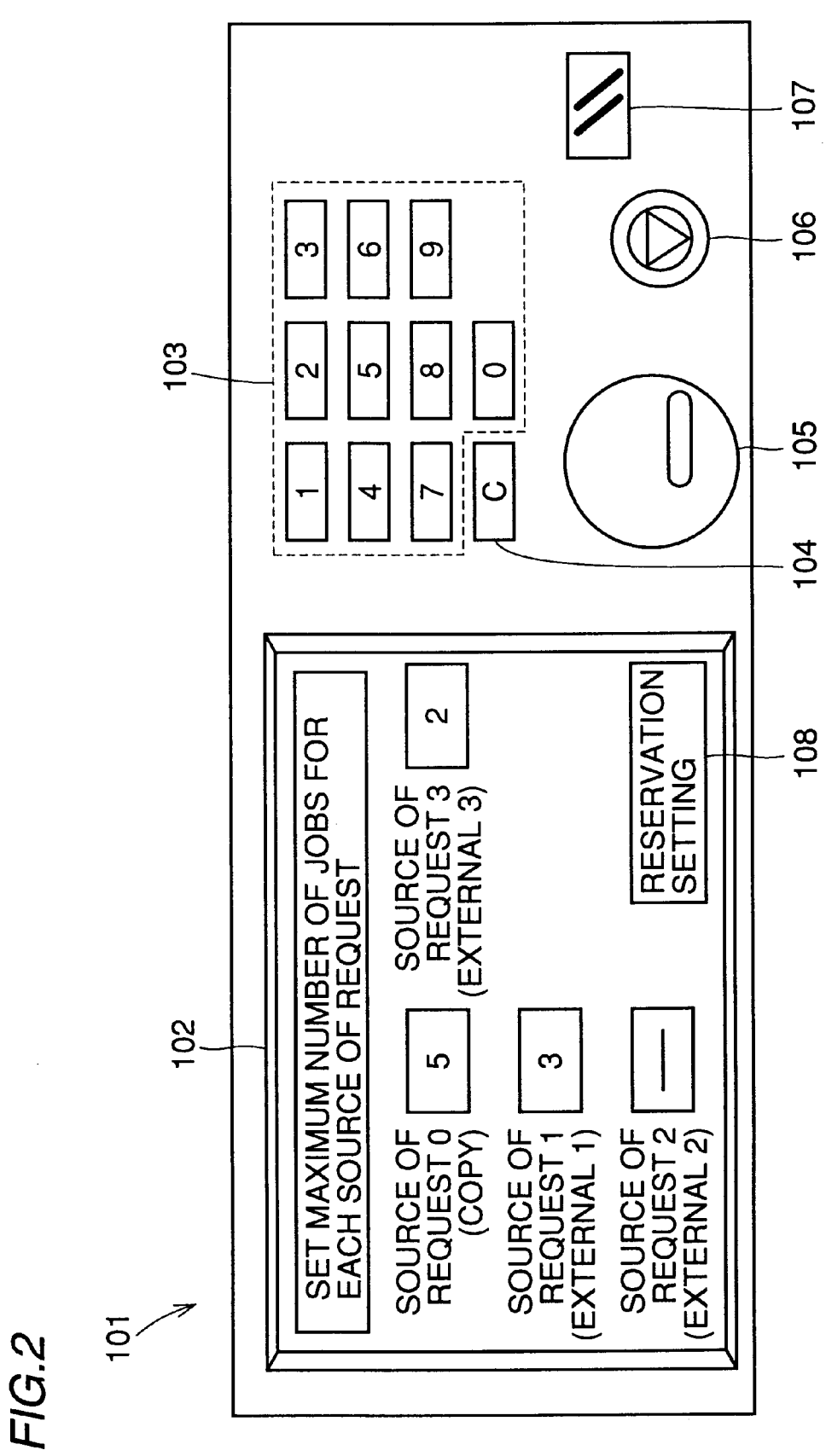
FIG. 2 shows an operation panel provided for the copying machine in FIG. 1.

FIG. 2 shows operation panel 101 provided for copying machine 1 in FIG. 1. Operation panel 101 includes: a touch panel 102 constituted by LCD by which various pictures and messages are displayed; a ten key 103 for input of some numbers such as the number of copies to be made and the zoom ratio; a clear key 104 for reset of the number of copies input by ten key 103 to "1", and for clearing the input zoom ratio; a start key 105 for starting printing operation; a stop key 106 for stopping a continues printing operation; and a panel reset key 107 for clearing all of the copying conditions set by pressing the keys and for resetting to the initial state.

A reservation setting key 108 is displayed on touch panel 102. By pressing reservation setting key 108, setting of a job for reservation can be made in copying machine 1. The setting of a job for reservation is made, when printing operation of a certain image data recorded in image memory unit 30 is carried out in optical system 60 and image forming system 70 of copying machine 1, for setting a condition for a printing operation for another image data of a job for which a printing operation is thereafter carried out.

Figure 3:
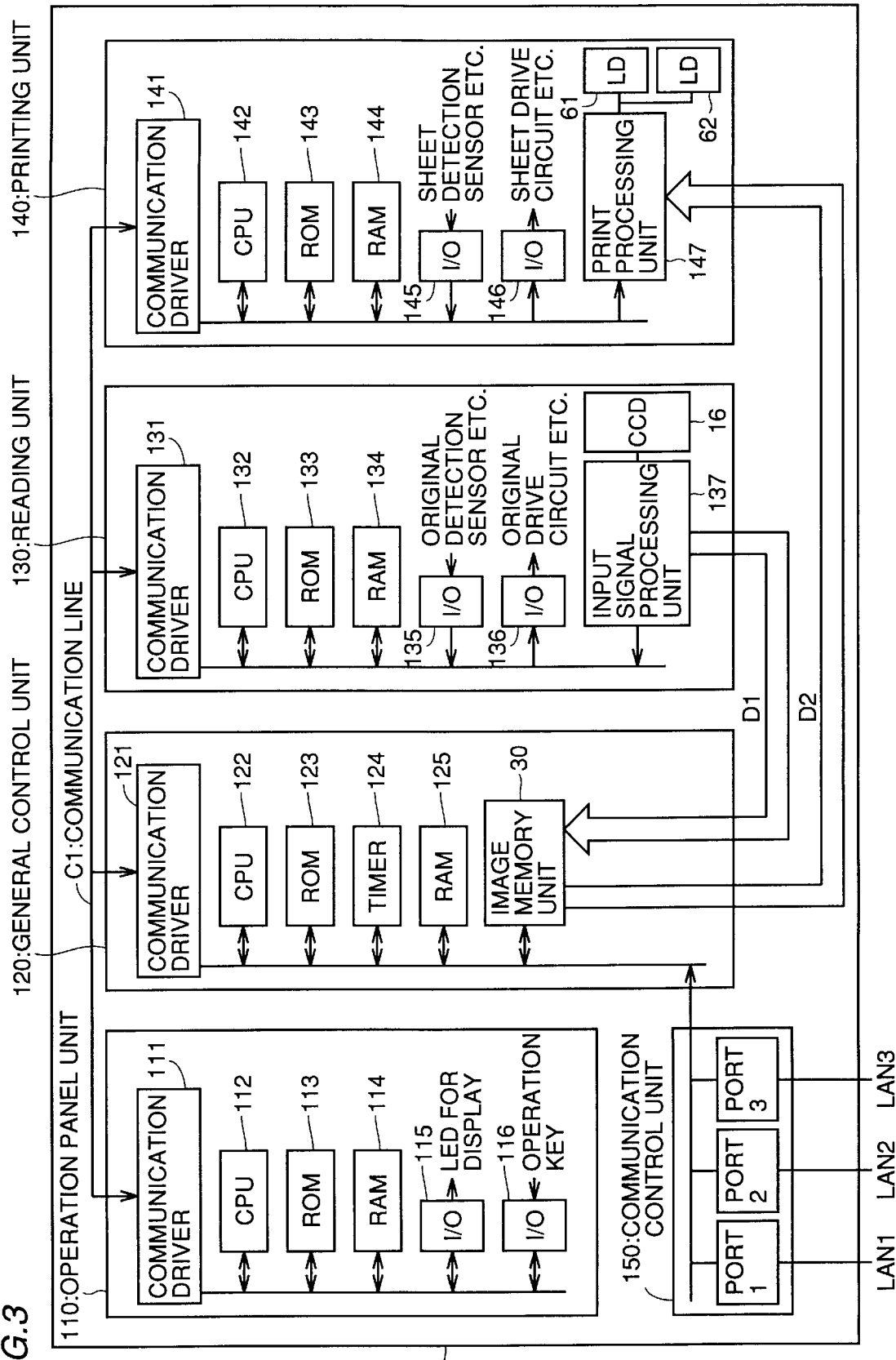
FIG. 3 shows a block diagram illustrating a structure of a print processing unit of the copying machine in FIG. 1.

FIG. 3 shows a block diagram of a structure of print processing unit 40 in copying machine 1.

Print processing unit 40 is constituted by an operation panel unit 110, a general control unit 120, a reading unit 130, a printing unit 140, and a communication control unit 150. Those units are connected such that they communicate with each other serially via communication drivers 111, 121, 131, and 141 and a communication cable C1 and transmit and receive command or status. Those units respectively include CPU 112, 122, 132, and 142, ROMs 113, 123, 133 and 143 in which respective programs are stored, and RAMs 114, 125, 134, and 144 as work areas for executing the programs. General control unit 120 is provided with a timer 124 which counts the time of one routine of a main routine.

Operation panel 110 is a block for controlling operation panel 101. Details set by various operation keys on operation panel 101 or touch panel 102 are read, and the result of the setting or operational state of copying machine 1 is displayed on LED or LCD. Information about the key input by a user, or on the touch panel is transmitted as a condition for forming an image through communication cable C1 to general control unit 120.

Reading unit 130 controls scan system 10 and document transport unit 500 described above. Reading unit 130 detects the state of feeding and transporting an original document or whether an original document is set at document transport unit 500 through an input/output circuit (I/O) 135, and controls a circuit for driving a document and a circuit for driving a mirror for scanning of a document through an input/output circuit 136. Image data read in photoelectric conversion element (CCD) 16 is transmitted to image memory unit 30 via an input signal processing unit 137.

Printing unit 140 controls the printer (PRT). Printing unit 140 detects the size of a sheet or the transporting state of the sheet through an input/output circuit 145, and controls a drive circuit for a sheet through I/O 146. Printing unit 140 further drives semiconductor lasers (LD) 61 and 62 according to data transmitted to print processing unit 146. Accordingly, printer PRT is controlled by printing unit 140 to enable processes such as feeding of a sheet, developing, transferring, and fixing in copying machine 1, and an images is formed on a desired sheet.

General control unit 120 controls the entire apparatus of copying machine 1. General control unit 120 manages an image read by image reader IR, and further manages image data transmitted from transmitters (devices on LANs 1–3) connected to copying machine 1 via communication control unit 150. General control unit 120 is provided with image memory unit 30 in which images of several hundreds to several thousands of documents read by image reader IR are stored. Image data transmitted via input signal processing unit 137 bus D1 of reading unit 130, or image data transmitted from communication control unit 150 is stored in image memory 30.

As shown in FIG. 3, copying machine 1 is connected to three LANs (LAN 1–3) via communication control unit 150, and image formation (print) is possible according to image data transmitted from respective personal computers on LANs 1–3.

In copying machine 1, image data read by image reader IR as well as image data transmitted from communication control unit 150 can be stored in image memory unit 30. Copying machine 1 is structured such that a plurality of sheets can be printed through one reading of data, by transmitting data from image memory unit 30 a plurality of times, when a plurality of prints are made for one image.

Further, image memory unit 30 has a capacity large enough to collectively store image data for a large number of documents, so that the order in which images are read can be changed for printing. Procedure of printing operation is stored in a table within RAM 125 of general control unit 120. When image data read by image reader IR and that transmitted from communication control unit 150 are printed, the printing is controlled referring to the table stored in RAM 125. Details of the table is thereafter described.

General control unit 120 sends its command to operation panel unit 110, reading unit 130, and printing unit 140, and carries out the whole reading operation and printing operation. Process of these operations is similar to the control in a conventional digital copying machine, and description thereof is omitted.

Figure 4:
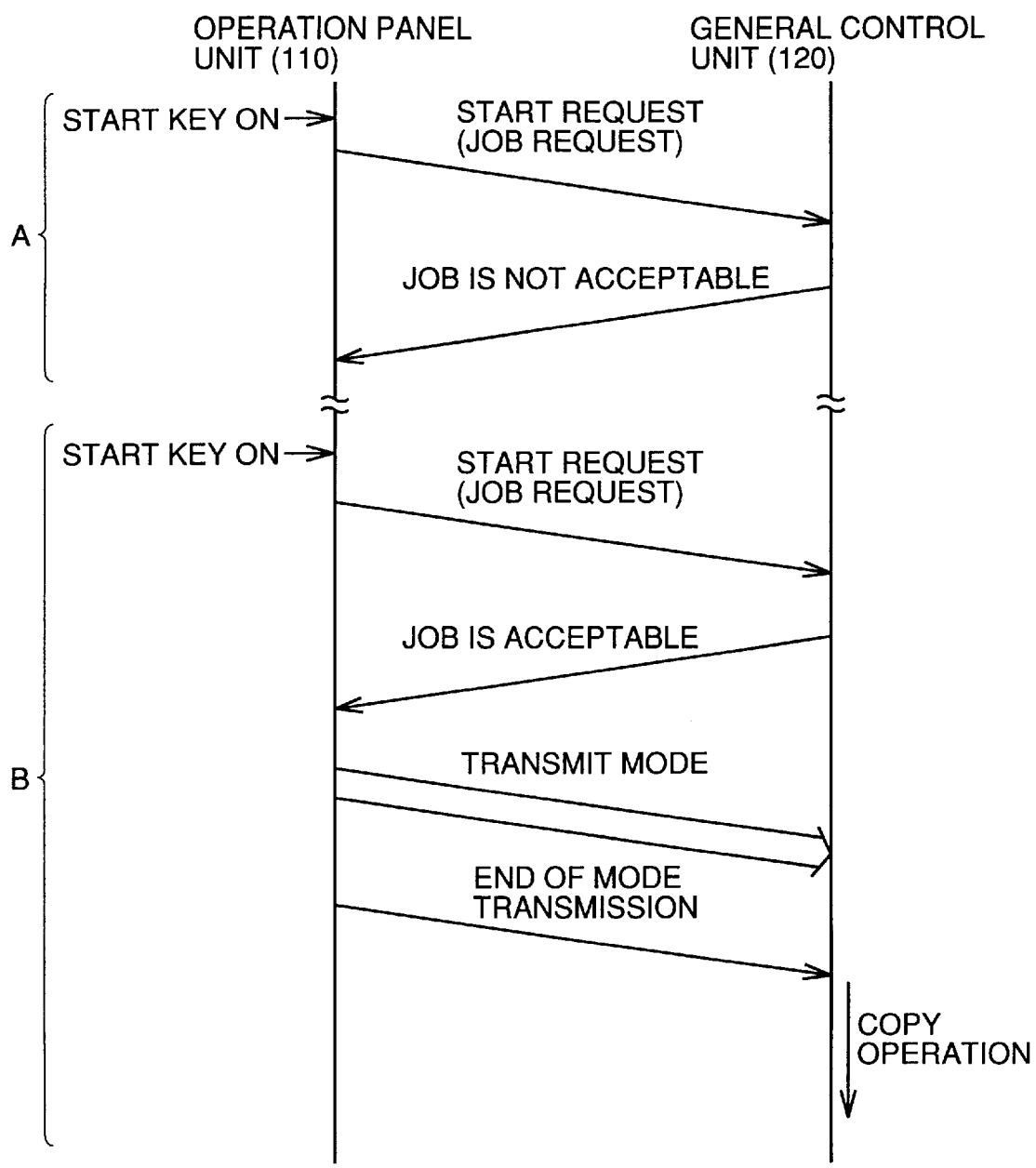
FIG. 4 shows a sequence in which the copying machine in FIG. 1 accepts print operation of an image read by an image reader.

FIG. 4 shows a sequence followed when a printing operation for an image read by image reader IR is accepted in copying machine 1.

When start key 105 on operation panel 101 is pressed, a start request (job request) is issued from operation panel unit 110 to general control unit 120. General control unit 120 checks if a condition for accepting a job described below is satisfied or not (see FIG. 11), and supplies the result to operation panel unit 110 in return. In FIG. 4, A shows a case in which the condition is not satisfied, and B shows a case in which the condition is satisfied. As shown in A, "job is not acceptable" is returned if the condition is not met, and as shown in B, "job is acceptable" is returned if the condition is met.

Operation panel unit 110 transmits a mode for printing an image read by image reader IR to general control unit 120 when it receives "job is acceptable". At completion of the transmission, operation panel unit 110 send a signal indicating the end of transmission. General control unit 120 starts operation for printing an image read by image reader IR (copy operation) when it receives the signal of the end of transmission.

If the above transmitted mode is not for immediately printing an image read by image reader IR but for printing after formation of an image for image data already stored in image memory unit 30 is carried out to some degree, this process proceeds as follows. General control unit 120 operates for storing in image memory unit 30 image data for an image read by image reader IR after the signal of end of transmission of the above mode is transmitted, and carries out printing at a proper timing (included in the mode above).

Figure 5:
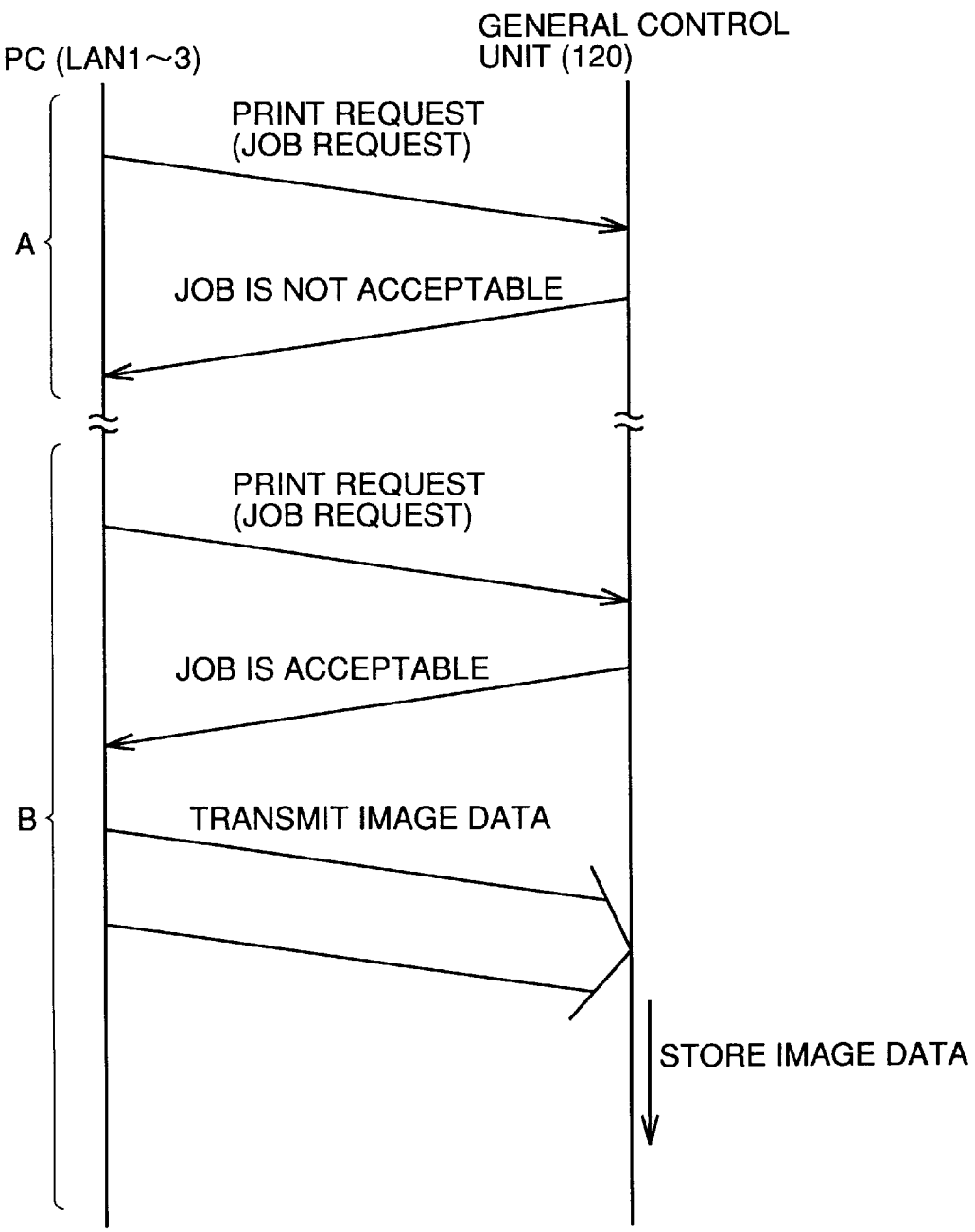
FIG. 5 shows a sequence in which the copying machine in FIG. 1 accepts print operation from personal computers (PCs) on LANs 1–3 in FIG. 3.

FIG. 5 shows a sequence followed when copying machine 1 accepts a printing operation according to image data transmitted from personal computers (hereinafter referred to as "PC")on LANs 1–3.

General control unit 120 determines if it accepts a job when it receives a print request (job request) from PC, and returns the result to PC (here handshaking is performed via LAN). In FIG. 5, A shows a case in which a condition for acceptance is not satisfied, and "job is not acceptable" is returned to PC. B shows a case in which the condition for acceptance is fulfilled, and "job is acceptable" is returned to PC.

As shown in B, PC transmits image data to general control unit 120 when it receives "job is acceptable." Accordingly, general control unit 120 stores the image data in image memory unit 30.

Figure 6:
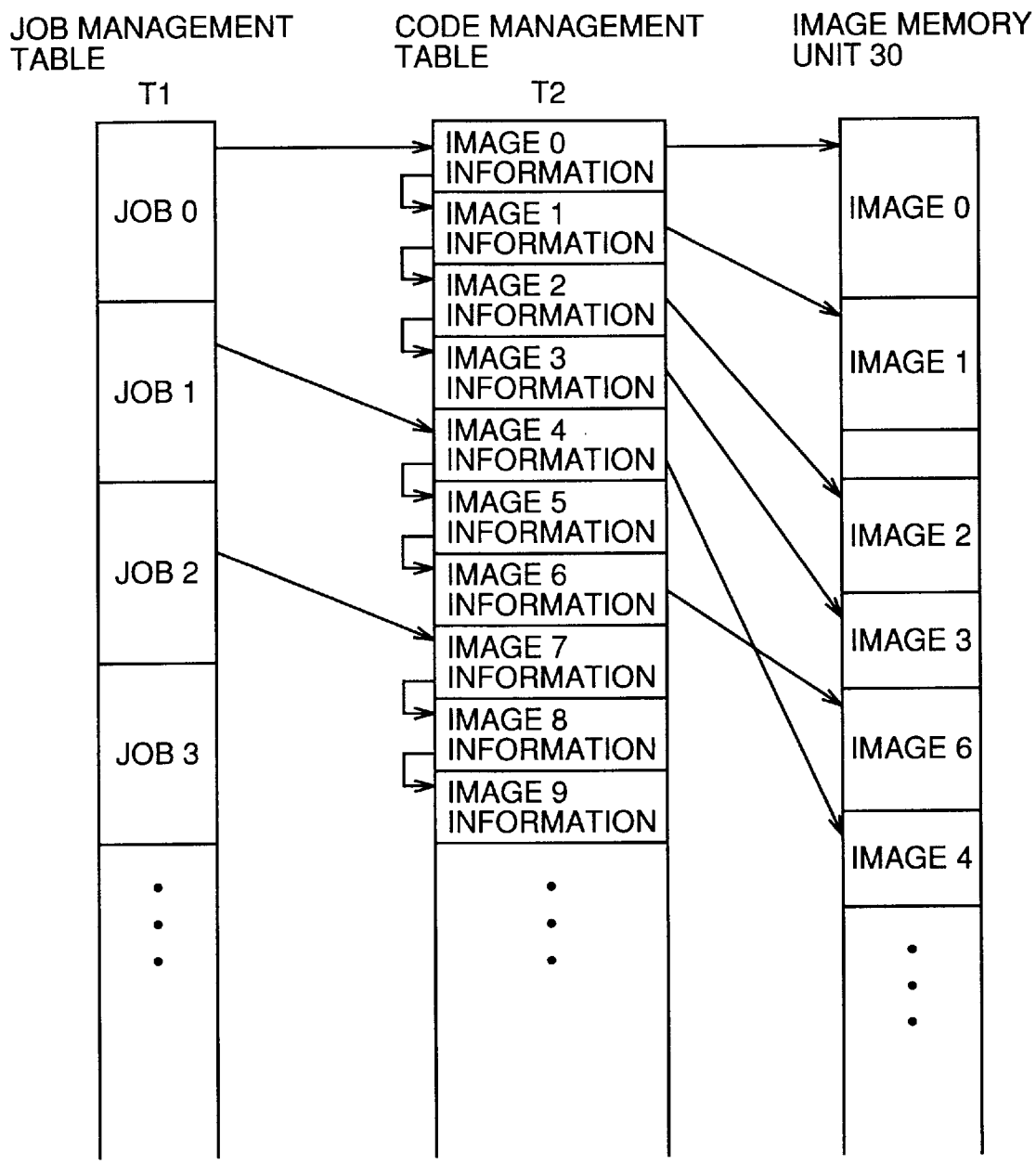
FIG. 6 is provided for description of a table for managing images and jobs in an RAM in a general control unit in FIG. 3.

FIG. 6 is provided for describing a table for managing the image and job, stored in RAM 125 of general control unit 120.

Image data for use at image formation is stored (registered) in image memory unit 30 as described above. This data is managed by a code management table T2 stored in RAM 125. In this table, some attributes of an image showing if the image is defined or not, an address showing where data is stored in image memory unit 30, the size of image data, and the like are stored as information for every one page of an image (every one sheet at single-sided printing) in image 0, image 1, image 2 . . . .

Copying machine 1 according to this embodiment can store a plurality of groups of documents (jobs), so that information for every job is stored in a job management table T1. Table T1 and code management table T2 are connected by a pointer, and information on an image from a job can be searched. As shown in T2, respective image data are connected by pointers in the order of images and both of information on an image and image data can be obtained by designating a job.

An operation mode for each job is stored in job management table T1. For example, if image data is from image reader IR, a printing mode designated by operation panel 101 is stored therein. If image data is supplied from an external PC, a printing mode designated in received data is analyzed to be stored therein.

Figure 7:
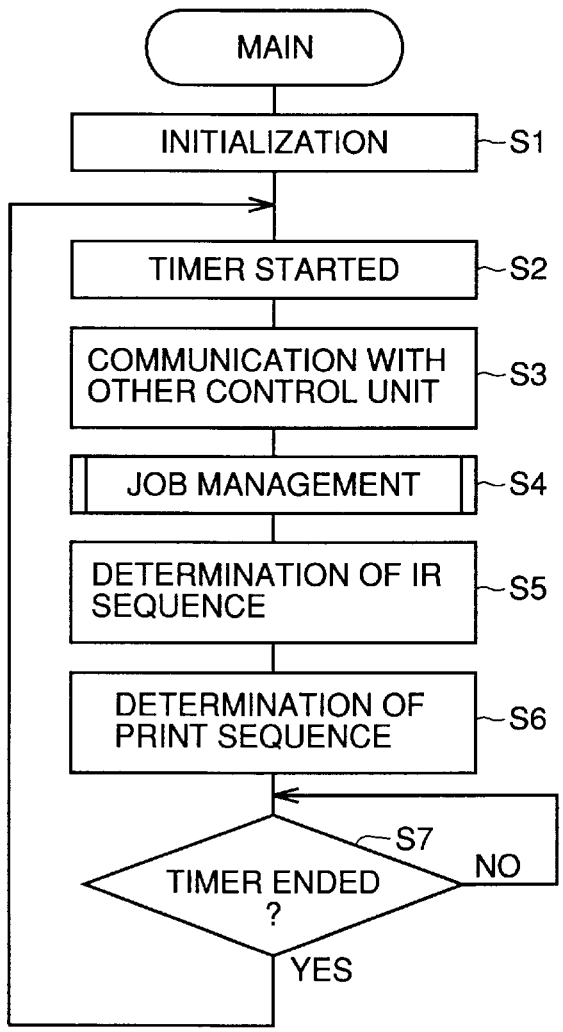
FIG. 7 shows a flow chart for a main routine of a CPU in the general control unit in FIG. 3.

FIG. 7 shows a flow chart for a main routine of CPU 122 in general control unit 120 in FIG. 3.

With reference to FIG. 7, when the power supply of copying machine 1 is turned on, a process for initializing a mode of copying machine 1 is carried out in step S1 ("step" is hereinafter omitted).

In S2, a routine timer which is set in advance for making a length of one period of the main routine constant is started.

Next in S3, a process for communicating with other CPU in FIG. 3 is carried out.

In S4, a process for managing a job of data stored in image memory unit 30 (see FIG. 1) is carried out.

In S5, a process for determining an operation of image reader IR is conducted.

Next in S6, a process for determining an operation of printer PRT is conducted.

In S7, whether the timer started in S2 is completed or not is determined. If completed, one routine is finished and the process starts from S2. Utilizing the length of time for one routine, counting in various timers in the subroutine described below is carried out. Values of various timers described below are constituted such that completion of a timer is determined by deciding how many times the main routine is repeated.

Figure 8:
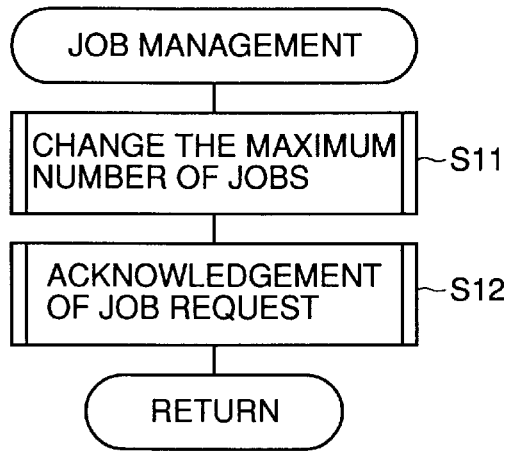
FIG. 8 shows a subroutine for a job management process in FIG. 7.

FIG. 8 shows a subroutine of a process for managing a job in S4 of FIG. 7.

First in S11, the maximum number of jobs (max_req_num(i)) in a job request number management table T3 shown in FIG. 9 is changed. i represents a source of request, and the maximum number (max_req_num(i)) is the maximum number of jobs for a source of request i.

Next in S12, a process of acknowledging a job request is carried out. Specifically, when a job is to be accepted, whether the job is "acceptable" or "not acceptable" is determined as shown in FIGS. 4 and 5, and this routine returns to its initial state.

FIG. 9 shows job request number management table T3 for managing the number of jobs to be accepted for determining if a job is acceptable or not as shown in FIGS. 4 and 5. This table T3 is stored in RAM 125.

In job request number management table T3, the maximum number of acceptable jobs (max_req_num(i)) as well as the number of jobs which has been accepted by general control unit 120 (current_req_num(i)) are stored for each source of request i (image reader IR, PC, and the like). In this table, the management is for respective sources of request for printing from image reader IR (source of request 0, copy), and for printing from externally connected PCs (sources of request 1, externals 1–3). An externally connected source of requests may be managed for each LAN connected via communication control unit 150, or may be managed for each PC on LAN. Further, externally connected transmitters may be regarded as source of request 1 (external 1) collectively, and the source of requests may be regarded as image reader IR (source of request 0, and external unit (source of request 1) to be managed.

In table T3, no value is stored as shown by "-" in the column of (max_req_num(i)) for source of request 2. This means that the maximum number is not set for jobs transmitted from source of request 2, so that jobs can be accepted to be stored to a limit of the capacity of image memory unit 30.

The maximum number of acceptable jobs (max_req_num(i)) for each source of request can be set using operation panel 101, and details of the setting are supplied from operation panel unit 110 to general control unit 120.

In copying machine 1, an established number can be set for a specific source of request when the maximum number (max_req_num(i)) is changed. Once the established number is set, the maximum number for the source of request is always set to at least the established number. According to this embodiment, the established number for source of request 0 is set to 1 in copying machine 1. Specifically, the maximum number of jobs transmitted from image reader IR which is source of request 0 should be set to 1 at a minimum (the maximum number should be set to at least 1). Since an established number is set for a specific source of request (in this case source of request 0), the maximum number for source of request 0 is not set to be smaller incorrectly ("0" in this case) when the maximum number is changed.

Next description of a process for changing (max_req_num(i)) (process for changing the maximum number of jobs) is given below.

Figure 10:
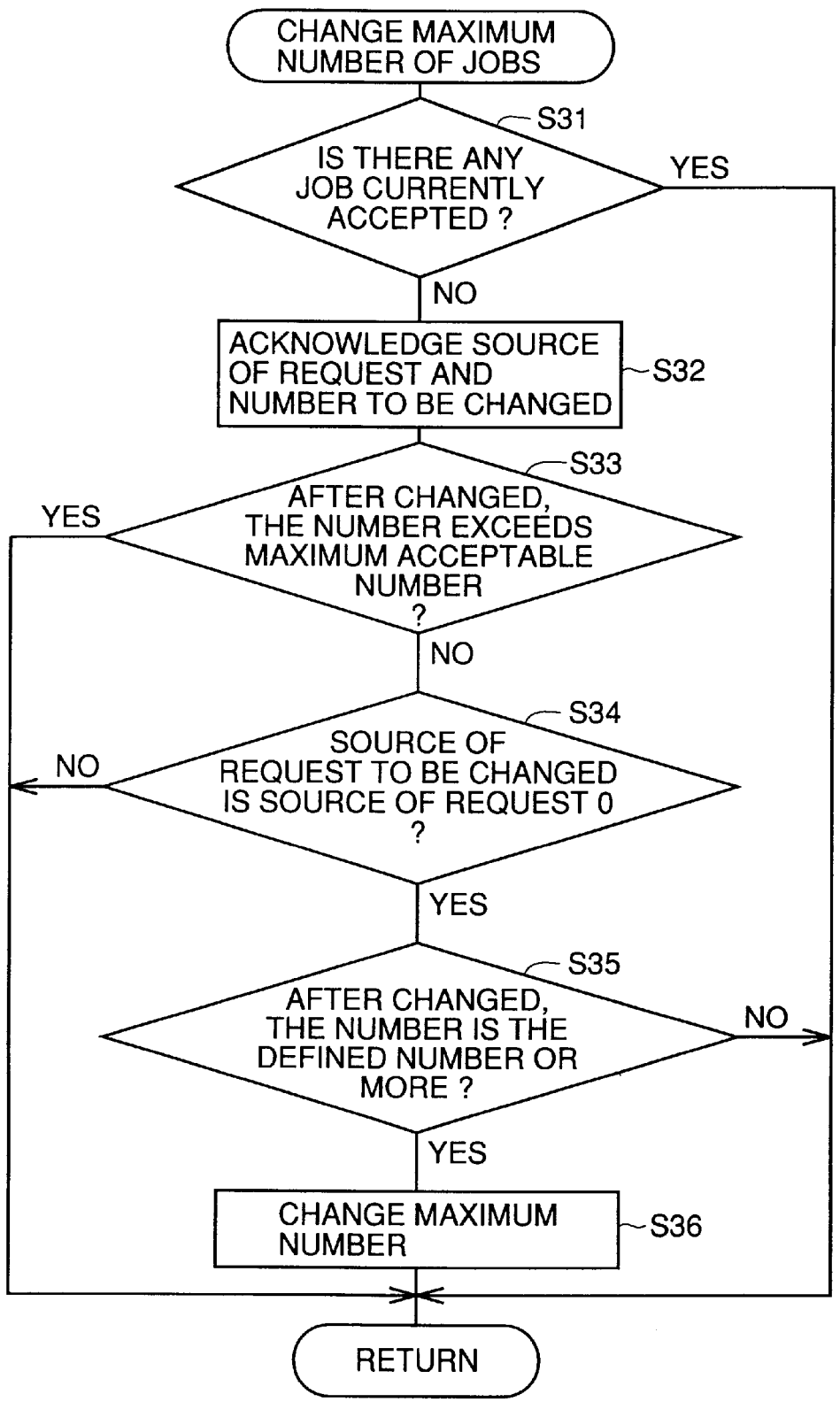
FIG. 10 shows a subroutine of a process for changing the maximum number of jobs.

FIG. 10 shows a subroutine of a process for changing the maximum number of jobs in S11 of FIG. 8.

Referring to FIG. 10, in S31, determination is made as to whether or not any job is currently accepted in general control unit 120 as stored as (current_req_num(i)) in table T3 of FIG. 9. If there is any job accepted, this process returns to the routine of the process for changing the maximum number of jobs. If there is no job accepted, a source of request as well as the number after changed (value of (max_req_num(i))) for which a change should be made, and which are input by a user to operation panel 101 are acknowledged in S32, and this process proceeds to S33.

In S33, determination is made as to whether the input number after changed for a source of request exceeds the maximum number (the value of (max_req_num(i))) in table T3 of FIG. 9 or not. If the input number exceeds the maximum number, the number cannot be changed to the input value, and the process returns to the routine of the process for changing the maximum number of jobs. If the input number does not exceed the maximum number, the process proceeds to S34.

In S34, whether the source of request input in S32 is source of request 0 or not is determined. If not, the process returns to the routine of the process for changing the maximum number of jobs, and if so, the process proceeds to S35.

In S35, determination is made as to whether the maximum number after changed is at least an established number as described above or not. If the maximum number is less than the established number, that is, the maximum number is not at least the established number, the process returns to the routine of the process for changing the maximum number of jobs. Through this control, the maximum number for source of request 0 is not set to less than the established number. If the maximum number is the established number or more, the process proceeds to S36, and the input maximum number (max_req_num(i)) for a source of request in table T3 of FIG. 9 is changed, and the process returns to the routine of the process for changing the maximum number of jobs.

Figure 11:
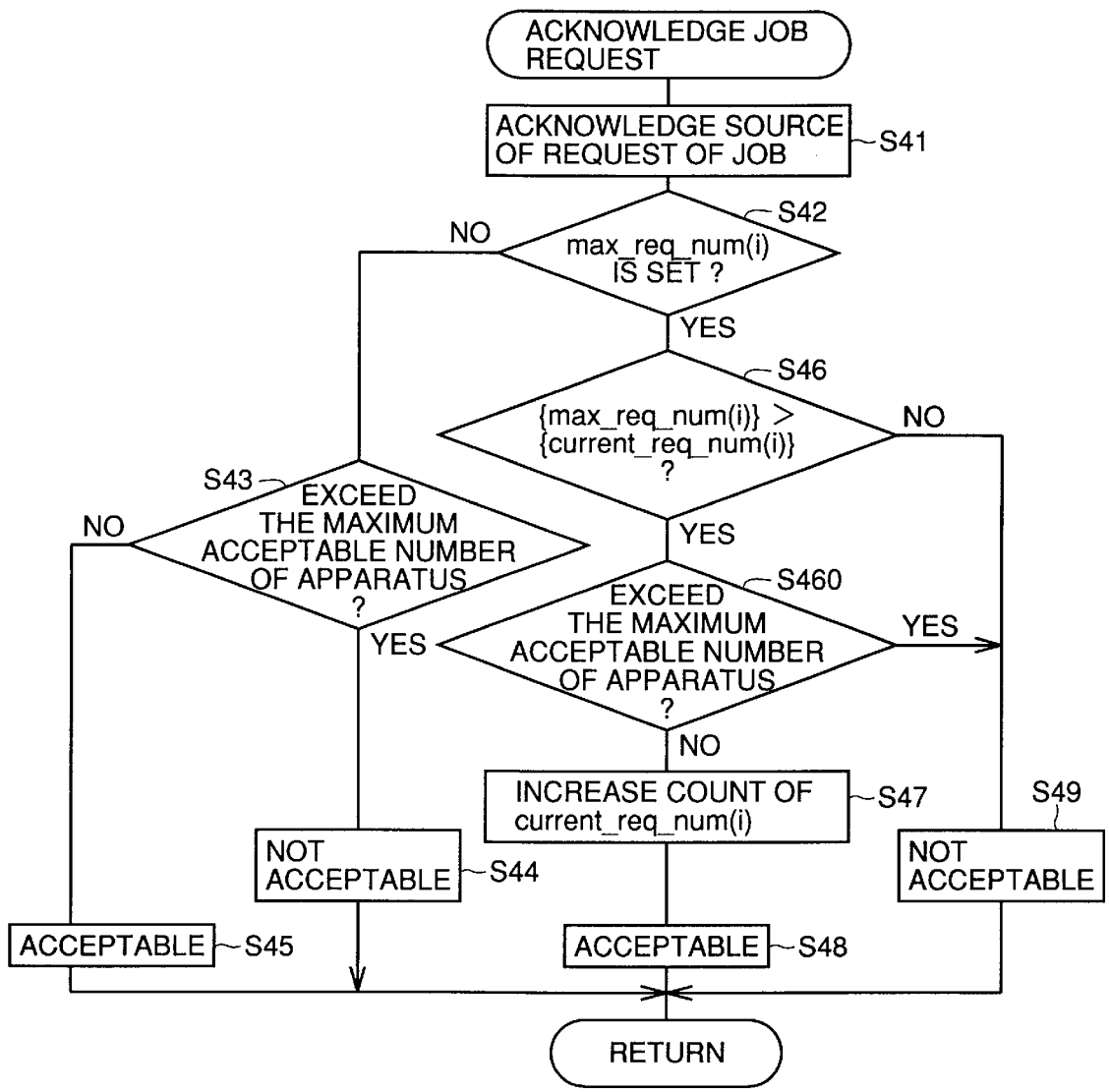
FIG. 11 shows a subroutine of a process for acknowledging job request.

FIG. 11 shows a subroutine of a process for acknowledging a job request in S12 of FIG. 8.

With reference to FIG. 11, in S41, when a job request is made as described referring to FIGS. 4 and 5, a source of request for the job is acknowledged, and S42 is carried out.

In S42, determination is made as to whether or not the acceptable maximum number (max_req_num(i)) is set in table T3 of FIG. 9 for the source of request acknowledged in S41. If there is any setting, the process proceeds to S46, and determination is made as to whether or not the number of jobs currently acceptable for the source of request (current_req_num(i)) is less than the acceptable maximum number (max_req_num(i)). If the currently accepted number is less than the acceptable maximum number, the process proceeds to S460, and determination is made as to whether or not the total number of jobs after the currently requested jobs are accepted exceeds the acceptable maximum number which is the limit of acceptance by image memory unit 30 in copying machine 1. If the total number does not exceed the acceptable maximum number, the value of (current_req_num(i)) for the source of request in table T3 is increased by "1" in S47, "acceptable" is transmitted to the source of request, and the process returns to the routine of the process for acknowledging the job request. If exceeds, and if the accepted number of jobs (current_req_num(i)) is determined not to be less than the acceptable maximum number (max_req_num(i)) in S46 (the value of (current_req_num(i)) reaches (max_req_num(i))), "not acceptable" is transmitted to the source of request in S49, and the routine of the process for acknowledging the job request is again carried out.

In S42, if the acceptable maximum number (max_req_num(i)) is not set in table T3 for the source of request acknowledged in S41, S43 is carried out in which determination is made as to whether or not the total number of jobs exceeds the acceptable maximum number which is the limit of acceptance of image memory unit 30 in copying machine 1 after the currently requested jobs are accepted. If the total number exceeds the acceptable maximum number, in S44, "not acceptable" is transmitted to the source of request since image memory unit 30 now stores jobs to its acceptable limit. If the total number does not exceed the acceptable maximum number, in S45, "acceptable" is transmitted to the source of request, and the routine of the process for acknowledging the job request is carried out.

According to this embodiment described above, a memory is constituted by image memory unit 30 in which image data for a plurality of jobs transmitted from a plurality of transmitters is stored.

An image forming unit is constituted by printer PRT in which an image is formed according to image data stored in the memory.

A maximum number memory unit which stores the maximum value of the number of jobs which can be stored in a memory defined for each transmitter is constituted by RAM 125 which stores the maximum number (max_req_num(i)) for each source of request in table T3 shown in FIG. 9.

RAM which stores the maximum number (max_req_num(i)) is backed up using a battery such that the maximum number is stored even if the power supply is turned off, or the maximum number may be stored by EEPROM.

A control unit is constituted by general control unit 120. The control unit controls such that when the number of jobs transmitted from an arbitrary transmitter reaches the maximum value stored in table T3, transmission of image data from the arbitrary transmitter to the memory is not accepted. General control unit 120 carries out the process for acknowledging job request in which determination is made as to whether or not a job request for a job transmitted based on table T3 shown in FIG. 9 is acceptable (see FIG. 11).

Copying machine 1 according to one embodiment of an image forming apparatus of the present invention is structured such that the maximum value for a prescribed transmitter is changed to at least a prescribed value when the maximum value is to be changed.

This structure is especially effective when a prescribed transmitter transmits image data for which a user is required to directly operate the image forming apparatus.

For example, if an image of a document read by image reader IR is formed in the image forming unit, a user needs to directly operate the image forming apparatus for effecting the operation of storing the image data of the document in the memory. This direct operation corresponds to, in copying machine 1, pressing of start key 105 of copying machine 1 by a user when an original document is read by image reader IR to be copied. For such a copying operation (corresponding to a print request from source of request 0), an established number is set for the number of acceptable jobs in copying machine 1. The maximum number of acceptable jobs is controlled such that the number is set to at least "1", that is, set to at least a prescribed value. Although a user is required, when the user moves to a place where copying machine 1 is located in order to making a copy, to abandon the copying due to lack of the memory capacity and to try copying again, such an inconvenience can be somewhat avoided.

The operation for which a user needs to directly operate copying machine 1 is not limited to the copying operation above. Direct operation by a user is also required when copying machine 1 has "security document print" mode. In "security document print" mode, even if copying machine 1 carries out image formation according to image data supplied from an external transmitter (not from an integrally placed transmitter), although data of a job is transmitted to general control unit 120 by a PC, printing of the data is not started until the user who applies the data directly operates copying machine 1 to allow printing.

In the embodiment described above, when image data are transmitted from a plurality of transmitters (sources or request) to copying machine 1, an upper limited is set on the number of jobs which can be transmitted by each source of request. In the structure of the copying machine 1, when a transmitter connected thereto makes a job request, even if image memory unit 30 can store still another jobs, a job from the transmitter (source of request) is not accepted if the number of jobs from the source or request has already reached its upper limit.

The structure allows image data from a specific transmitter to be accepted in preference to image data from other transmitters since transmission of image data from a transmitter other than a transmitter (source of request) to which priority is given is restricted.

It is noted that a manner in which image data from a specific transmitter is accepted in preference to image data from other transmitters is not exclusively applied to this embodiment.

(Second Embodiment)

Description of the second embodiment of the present invention will be given below concerned mainly with changes from the first embodiment.

An image forming apparatus according to the second embodiment is constituted by a copying machine 1 similar to that of the first embodiment. The outward structure thereof is similar to that described referring to FIGS. 1 and 2 in the first embodiment, and description of the structure of the second embodiment is omitted here.

Structures of print processing unit 40 and the like are also similar to those described referring to FIGS. 3–7, and description thereof is also omitted.

A difference between copying machine 1 of this embodiment and that of the first embodiment is details of the subroutine of the job management processing in S4 of FIG. 7.

Figure 12:
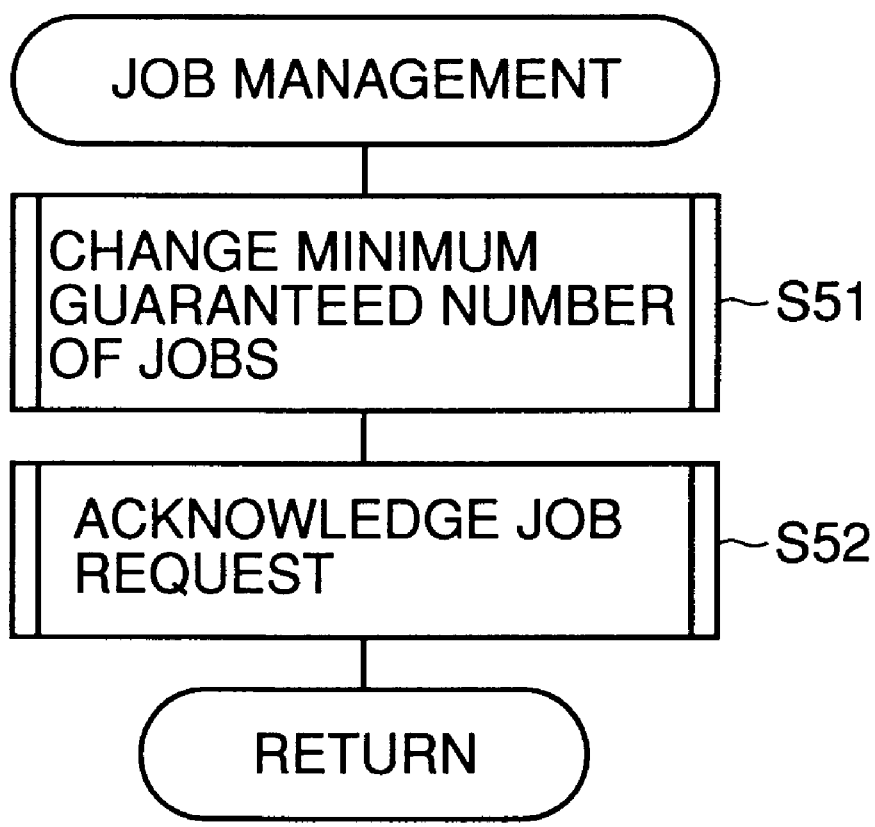
FIG. 12 shows a variation of the subroutine of the job management process in FIG. 7.

FIG. 12 shows a subroutine of a job management process according to the second embodiment.

In S51, a minimum guaranteed number (min_req_num(i)) in a job request number management table T4 shown in FIG. 13 is changed. The minimum guaranteed number (min_req_num(i)) is the minimum number of jobs accepted by image memory unit 30.

In S52, a job request acknowledgment process for determining if a job is "acceptable" or "not acceptable" is carried out when a job is to be accepted as shown in FIGS. 4 and 5, and the process thereafter returns to its initial state.

FIG. 13 shows a table for managing the number of jobs to be accepted for determining if a job is accepted or not as shown in FIGS. 4 and 5 in copying machine 1 of this embodiment. This table is referred to as job request number management table T4. The table T4 is stored in RAM 125 (see FIG. 3). The RAM which stores the minimum number (min_req_num(i)) is backed up using a battery such that the number is stored even if a power supply is turned off. The number may be stored in EEPROM.

In the job request number management table T4, following three numbers are stored for respective sources of request. The three numbers are: the number of jobs which has been already accepted in general control unit 120 (current_req_num(i)); the minimum guaranteed number of jobs that are guaranteed to be accepted (min_req_num(i)); and the value of the sum of the number accepted by the copying machine (current_req_sum) which is the sum of the number of the jobs from all of the sources of request which have been accepted already (sum of (current_req_num(i)) of all sources of request).

In table T4, the minimum guaranteed number for source of request 0 is "3", and there is no minimum guaranteed number stored for sources of request 1–3. This means that a storage area for minimum three jobs is ensured for image data transmitted from source of request 0 in image memory unit 30. In other words, even if the remaining number of jobs which can be stored in image memory unit 30 is "3", a storage area for the remaining three jobs is ensured for a print request from source of request 0 when no job transmitted from source of request 0 is stored in image memory unit 30. In other words, even if the remaining number of jobs which can be stored in image memory unit 30 is "3", a storage area for the remaining three jobs is ensured for a print request from source of request 0 when no job transmitted from source of request 0 is stored in image memory unit 30, and any print request from a source of request except for source of request 0 is not accepted. Further, when the remaining number of jobs which can be stored in image memory unit 30 is "3", if two jobs from source of request 0 are stored in the image memory, a storage area for one of the three jobs is ensured for source of request 0, so that two jobs from other sources of request except for source of request 0 can be accepted.

The minimum guaranteed number is the minimum number of jobs guaranteed to be stored in image memory unit 30. Accordingly, if image memory unit 30 has a storage area in which some jobs can still be stored, minimum three jobs from source of request 0 can be accepted.

In the second embodiment, the maximum number of jobs which can be stored in image memory unit 30 is set to "120".

The minimum guaranteed number (min_req_num(i)) for each source of request can be set using operation panel 101, and details of the setting is supplied from operation panel unit 110 to general control unit 120.

A process for changing (min_req_num(i))(process of changing the minimum guaranteed number of jobs) is described below.

Figure 14:
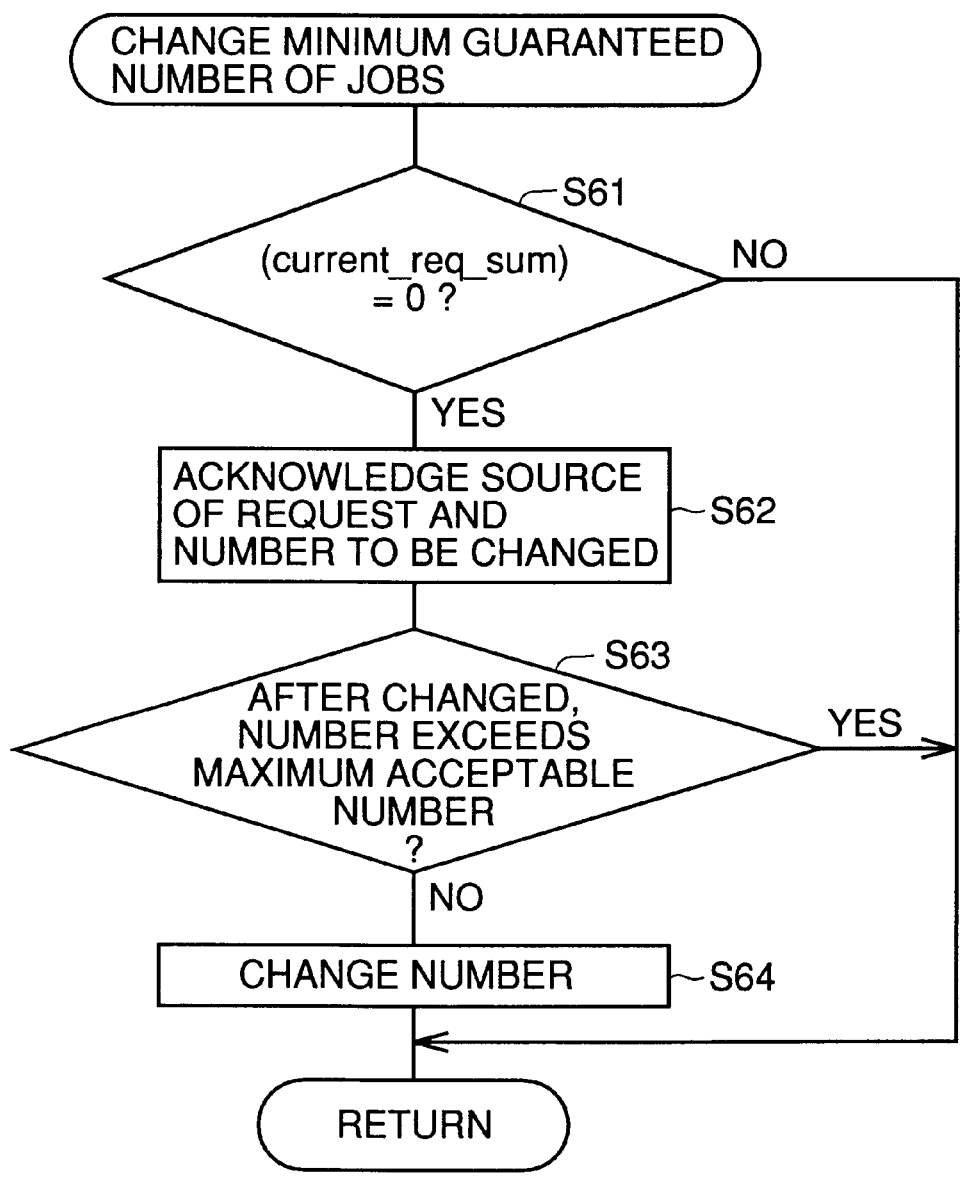
FIG. 14 shows a subroutine of a process for changing the minimum number of guaranteed jobs in FIG. 12.

FIG. 14 shows a subroutine of a process for changing the minimum guaranteed number of jobs in S51 of FIG. 12.

With reference to FIG. 14, in S61, determination is made as to whether a value of sum of accepted jobs (current_req_sum) in table T4 of FIG. 13 is 0 or not. If the value is not 0, the process for changing the job minimum guaranteed number is again carried out. When the value of sum of accepted jobs is not 0, that is, the copying machine is structured such that the minimum guaranteed number can be changed when some jobs are already stored in image memory unit 30, the minimum guaranteed value which has already been set may not correspond to the number of jobs for each source of request now stored in image memory unit 30. If the value of sum of accepted jobs is 0, in S62, a source of request and the minimum guaranteed number after changed that are input for changing using operation panel 101 are acknowledged, and this process proceeds to S63.

In S63, determination is made as to whether the minimum guaranteed number after changed exceeds the maximum number of jobs which can be stored in image memory unit 30 or not. If exceeds, the procedure returns to the process for changing job minimum guaranteed number. If not exceeds in S64, the minimum guaranteed number for the input source of request in table T4 is changed, and the procedure returns to the process for changing minimum guaranteed number of jobs.

Figure 15:
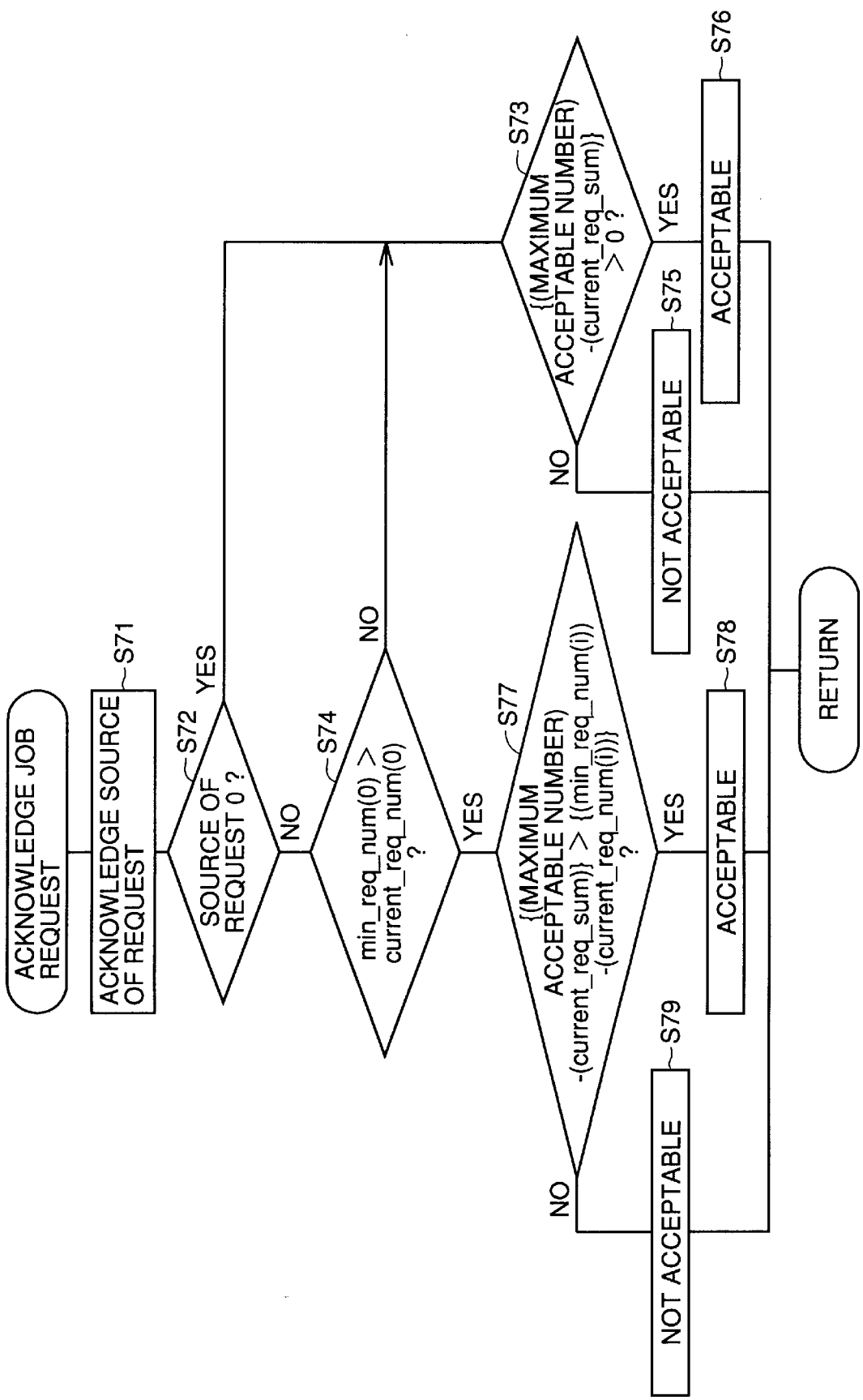
FIG. 15 shows a subroutine of a process for acknowledging the job request in FIG. 12.

FIG. 15 shows a subroutine of a process for acknowledging a job request in S52 of FIG. 12.

Referring to FIG. 15, in S71, a source of request which has made a job request as described with reference to FIGS. 4 and 5 is acknowledged, and next S72 is carried out.

In S72, whether or not the source of request acknowledged in S71 is source of request 0 (image reader IR) for which the minimum guaranteed number is set in table T4 of FIG. 13. When the source of request is source of request 0, S73 is carried out, and if not source of request 0, S74 is carried out.

In S74, determination is made as to whether or not the number of jobs which has been accepted for a source of request for which the minimum guaranteed number is set is more than the minimum guaranteed number. According to this embodiment, a minimum guaranteed number is set for source of request 0, and determination is made as to whether or not the number of currently accepted jobs for source of request 0 (current_req_num(0)) exceeds the minimum guaranteed number(min_req_num(0)). If it is determined that the number of currently accepted jobs for source of request 0 is less than the minimum guaranteed number for source of request 0, S73 is carried out.

In S73, determination is made as to whether or not the number of jobs stored currently in image memory unit 30 reaches the maximum number of jobs which can be stored in image memory unit 30 (the maximum number of jobs which can be accepted: "20" in this embodiment). If the number of jobs stored in the memory unit reaches the maximum number of jobs, "not acceptable" is transmitted to a source of request of a job. If not reaches, "acceptable" is transmitted, and the process for changing job minimum guaranteed number is performed.

When it is determined in S74 that current_req_num(0) exceeds min_req_num(0), S77 is performed.

In S77, determination is made as to whether or not the number of remaining jobs which can be stored currently in image memory unit 30 {(the maximum acceptable number of jobs)−(current_req_sum)} exceeds the number of jobs obtained by subtracting, the number of jobs requested from a source of request for which a minimum guaranteed number is set (source of request 0 in this embodiment), from the number of jobs corresponding to the minimum guaranteed number in image memory unit 30 {min_req_num(0)−current_req_num(0)}. If the number is determined to exceed, "acceptable" is transmitted to the source of request for the job in S78. If the number is determined not to exceed, that is, {(maximum acceptable number)−(current_req_sum)} ≦ {(min_req_num(0))−(current_req_num(0))}, "not acceptable" is transmitted to the source of request for the job in S79, and the routine of processing for changing job minimum guaranteed number of jobs is performed. This structure ensures that the minimum guaranteed number of jobs is stored in image memory unit 30, from a source of request for which the minimum guaranteed number is set.

In the second embodiment described above, a storage area for a specific amount is ensured for a specific source of transmission in a memory, since the job request number management table T4 including the minimum guaranteed number for a source of transmission 0 (min_req_num(0)) is stored in RAM 125.

In this embodiment, image data from a source of transmission other than the specific source of transmission to image memory unit 30 is only accepted when following 1 or 2 is satisfied. In the following 1 and 2, k is the maximum amount of image data (for a job) which can be stored in image memory unit 30 (the maximum number of acceptable jobs: 20 jobs in this embodiment), p is the total amount of image data (for a job) stored in image memory unit 30 (current_req_sum), m is an amount of image data (for a job) transmitted from a specific source of transmission (in this case image reader IR) and stored in image memory unit 30, and n is a specific amount of storage area ensured for a specific source of transmission (minimum guaranteed number).

1. if n>m, (k−p)>(n−m)
2. if n≦m, (k−p)>0

In the first and second embodiments of the present invention described above, as described referring to FIG. 5, when copying machine 1 receives a print request from a PC, the PC which receives "acceptable" transmits image data, and the transmitted image data is stored in image memory unit 30. A possible variation is as follows.

Figure 16:
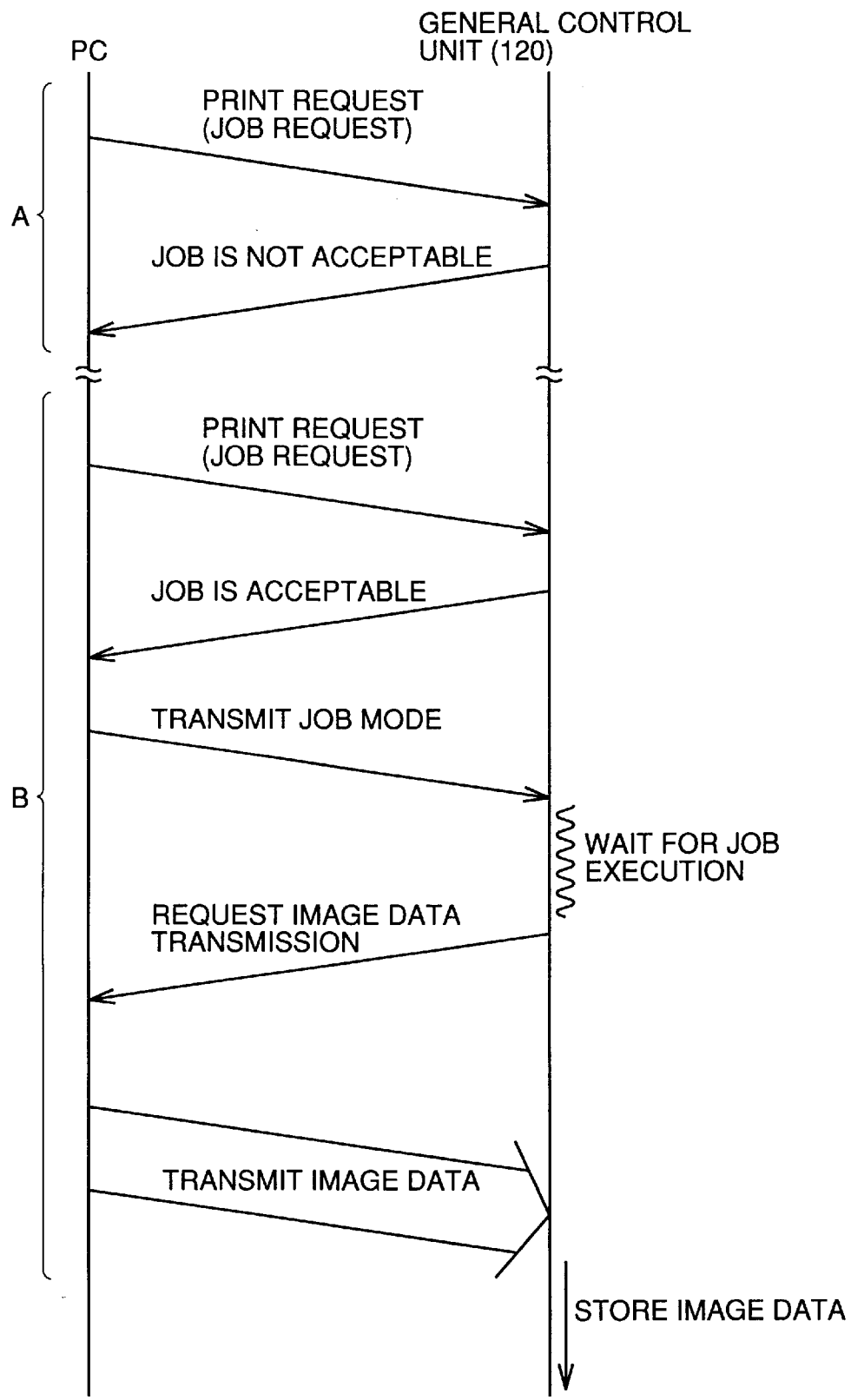
FIG. 16 shows a variation of the sequence in FIG. 5.

With reference to FIG. 16, a variation of the sequence in FIG. 5 is shown. The PC receiving "acceptable" in B of FIG. 16 does not transmit the entire image data but transmits only a job mode to general control unit 120. In response, general control unit 120 stores only the job mode in the job management table T1 and the code management table T2 in FIG. 6, and waits for the job to be executed. At the execution of the job, general control unit 120 requests a PC to transmit image data. In response, the PC transmits the entire image data to general control unit 120. In this case, copying machine 1 may be structured such that the storage capacity of image memory unit 30 is smaller.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus connected to a plurality of transmission devices that transmit a plurality of image forming jobs to the image forming apparatus, said apparatus comprising:
    a receiver which receives said plurality of image forming jobs;
    a memory which stores image data for said plurality of image forming jobs;
    an image forming unit which forms images according to the image data stored in said memory;
    a maximum value memory which stores a maximum value representing a maximum number of image forming jobs which can be stored in said memory for each of said transmission devices; and
    a controller which controls said image forming apparatus such that said image forming apparatus rejects a new image forming job from a one of said transmission devices when the new image forming job would increase the number of pending image forming jobs from said one transmission device beyond said maximum value for said one transmission device.

2. The image forming apparatus according to claim 1, further comprising a setting unit which sets the maximum value for each of said transmission devices.

3. The image forming apparatus according to claim 2, wherein said controller accepts new image forming jobs from a one of the transmission devices for which said maximum value is not set, as long as said memory has room to store the new image forming jobs.

4. The image forming apparatus according to claim 2, wherein
    said setting unit sets a lower limit of said maximum value.

5. The image forming apparatus according to claim 2, wherein
    said setting unit sets a lower limit of said maximum value for a specific transmission device among said plurality of transmission devices.

6. The image forming apparatus according to claim 1, wherein said controller accepts new image forming jobs from a one of the transmission devices for which said maximum value is not set, as long as said memory has room to store said new image forming jobs.

7. The image forming apparatus according to claim 1, wherein, when said controller determines that it can accept a new image forming job transmitted from a one of said transmission devices, said controller transmits an acceptance signal to the one transmission device indicating that the new image forming job is acceptable.

8. The image forming apparatus according to claim 7, wherein said controller transmits, when said new image forming job is acceptable, a request signal to said one transmission device for requesting the one transmission device to transmit image data for the new image forming job.

9. An image forming apparatus connected to a plurality of transmission devices that transmit a plurality of image forming jobs to the image forming apparatus, said apparatus comprising:
    a first memory which stores image data for said plurality of image forming jobs;
    an image forming unit which forms images according to the image data stored in said first memory;
    a second memory which stores a minimum value representing a minimum number of image forming jobs to be stored in said first memory from a prescribed transmission device among said plurality of transmission devices; and
    a controller which controls said image forming apparatus such that said image forming apparatus maintains enough free space in said first memory to accept the minimum number of image forming jobs from said prescribed transmission device.

10. The image forming apparatus according to claim 9, further comprising a setting unit which sets the minimum value for the prescribed transmission device.

11. The image forming apparatus according to claim 10, wherein
    the number of jobs can be set by said setting unit when said first memory does not store the number of jobs.

12. The image forming apparatus according to claim 10, wherein said controller includes a determination unit for determining whether a new image forming job from said prescribed transmission device can be accepted, and said controller transmits an acceptance signal to the prescribed transmission device when the new image forming job is acceptable.

13. The image forming apparatus according to claim 12, wherein, when said controller determines that it can accept the new image forming job from the prescribed transmission device, said controller transmits a request signal to said prescribed transmission device for requesting it to transmit image data for the new image forming job.

14. A method for handling a plurality of image forming jobs in an image forming apparatus that includes a memory for storing image data of said plurality of image forming jobs transmitted from a plurality of transmission devices, and an image forming unit which forms images according to the image data stored in said memory, said method comprising the steps of:
    acknowledging a job request from a one of said transmission devices;
    determining whether, when added to a number of pending jobs from the one transmission device, the job request will increase the number of pending jobs from the one transmission device beyond a maximum number of jobs which can be accepted from the one transmission device; and
    refusing to accept the job request from the one transmission device when it is determined that the job request would increase the number of pending jobs from the one transmission device beyond the maximum number of jobs.

15. An image forming apparatus comprising:
a memory which stores image data transmitted from a plurality of transmission devices, a specific amount of storage area ensured for a specific transmission device in said memory; and
a control unit which controls such that transmission of image data from said transmission device to said memory is not accepted when a prescribed condition is satisfied, said control unit accepts transmission, when image data is transmitted from a transmission device other than said specific transmission device if $$n > m \quad (1)$$

and $$(k-p) > (n-m) \quad (2)$$

or $$n \leq m \quad (3)$$

and $$(k-p) > 0 \quad (4)$$

are satisfied, where
k is a maximum amount of image data which can be stored in said memory,
p is a total amount of image data stored in said memory,
m is an amount of image data transmitted from said specific transmission device and stored in said memory, and
n is said specific amount of storage area.

16. An image receiving apparatus connected to a plurality of transmission devices that transmit a plurality of image forming jobs to the image receiving apparatus, said apparatus comprising:
a receiver which receives said plurality of image forming jobs;
a memory which stores image data for said plurality of image forming jobs;
a maximum value memory which stores a maximum value representing a maximum number of image forming jobs which is stored in said memory for each of said transmission devices; and
a controller which controls said image receiving apparatus such that said image receiving apparatus rejects a new image forming job from a one of said transmission devices when the new image forming job would increase the number of pending image forming jobs from said one transmission device beyond said maximum value for said one transmission device.

17. An image receiving apparatus connected to a plurality of transmission devices that transmit a plurality of image forming jobs to the image receiving apparatus, said apparatus comprising:
a first memory which stores image data for said plurality of image forming jobs;
a second memory which stores a minimum value representing a minimum number of image forming jobs to be stored in said first memory from a prescribed transmission device among said plurality of transmission devices; and
a controller which controls said image receiving apparatus such that said image receiving apparatus maintains enough free space in said first memory to accept the minimum number of image forming jobs from said prescribed transmission device.

18. A method for handling a plurality of image forming jobs in an image receiving apparatus that includes a memory for storing image data of said plurality of image forming jobs transmitted from a plurality of transmission devices, said method comprising the steps of:
acknowledging a job request from a one of said transmission devices;
determining whether, when added to a number of pending jobs from the one transmission device, the job request will increase the number of pending jobs from the one transmission device beyond a maximum number of jobs which can be accepted from the one transmission device; and
refusing to accept the job request from the one transmission device when it is determined that the job request would increase the number of pending jobs from the one transmission device beyond the maximum number of jobs.

* * * * *